Feb. 23, 1937.  J. G. BURNS  2,071,453
ANIMAL SNARE
Filed March 23, 1936

Inventor
John G. Burns

By Clarence A. O'Brien and
Hyman Berman
Attorneys

Patented Feb. 23, 1937

2,071,453

UNITED STATES PATENT OFFICE 2,071,453

ANIMAL SNARE

John Guin Burns, Pulaski, Tenn.

Application March 23, 1936, Serial No. 70,525

2 Claims. (Cl. 43—87)

This invention relates to animal catching devices in general and more particularly to a device which may be more aptly termed an animal snare, the object of the invention being to provide a simple, positive and effective means for trapping fur-bearing animals in such a manner as to positively prevent escape of the latter.

The invention together with its objects and advantages will be best understood from a study of the following description taken in connection with the accompanying drawing wherein.

Figures 1, 2:
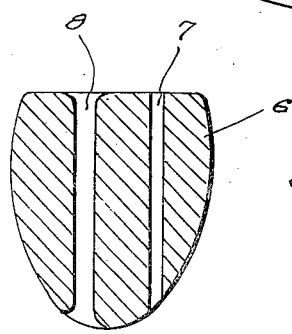
Figure 1 is an elevational view illustrating the invention.
Figure 2 is a sectional view through a weight forming part of the invention.

Referring to the drawing by reference numerals it will be seen that in the preferred embodiment thereof the trap comprises a length of wire or the like 5 to one end of which is secured a weight 6.

The weight 6 is preferably of the size and shape suggested in the drawing and has extending therethrough two longitudinal openings or bores 7 and 8 respectively.

In attaching one end of the wire 5 to the weight 6 it will be seen, as clearly shown in Figure 1, that an end of the wire 5 is passed through the bore or opening 7 then bent back upon itself and twisted about an adjacent portion of the wire 5 as at 9 in a manner to form a coil which also serves to secure to the wire 5 adjacent the weight equipped end thereof an impaling hook 10. Any suitable hook may be used, for the purpose of illustration there being shown a more or less conventional fish hook. The purpose of the hook 10 as will hereinafter be more manifest is to pierce and penetrate the hide of the game in a manner to positively prevent escape of the game from the trap.

The relatively opposite end of the wire 5 is trained through the opening or bore 8 in the weight and is then bent back upon itself to provide an elongated loop 11. The extreme terminal portion of this end of the wire 5 is twisted about the main strand of the wire as at 12 and terminates in an eye 13. A keeper member 14 formed from a single strand of wire has an end passed through the aforementioned opening 7 and at one end is coiled about itself as at 15 to provide a stop preventing passage of the wire 14 through the opening 7 in one direction. At its free end the wire 14 is bent upon itself and then twisted about an end portion of the wire 5 as at 16 to provide a keeper loop 17.

A trigger member 18 is formed of a suitable length of wire longitudinally curved and at one end formed to provide an eye loosely engaged with the eye 13 as at 19.

Slightly inwardly from the eye equipped end thereof the trigger wire 18 has a portion offset and bent into the form of a U to provide a latch member 20 which, when the wire 5 has been worked into the form of a loop shown in Figure 1 engages with the keeper loop 17 for releasably securing the wire 5 in this looped condition.

In actual practice the snare is set as in Figure 1 and through the medium of the loop 11 other suitable means is secured or anchored in place. Preferably the snare is anchored to some object in such a manner or way to permit the loop to be suspended over or at the entrance to the den or other habitat of the animal so that when the animal makes his exit, he will be obliged to pass through the loop.

Obviously as the animal passes through the loop his body will come into contact with the trigger 18 thus moving the head 20 of the trigger out of engagement with the keeper loop 17. This will result in freeing the weight 6 and the latter will then by gravity be caused to move along the wire 5 in a manner to draw the loop 5 taut about the animal and at the same time cause the hook 10 to penetrate the hide of the animal to the end that the latter will be positively and efficiently secured within the snare against escape.

To release an animal caught therein the snare is expanded by merely sliding the weight along the wire 5 toward the loop equipped end 11 thereof as is thought to be apparent.

Having thus described the invention, what is claimed as new is:

1. In an animal snare, a length of flexible wire adapted to be attached at one end to a fixed object, the opposite end of said wire comprising a contractible loop, a weight secured to the free end of said wire and having an opening therethrough through which the anchored end of said wire is trained, a keeper member carried by said weight, and a trigger member pivotally connected at one end with the wire adjacent the anchored end of the latter, said trigger member having a head engageable with the keeper for releasably retaining the loop in expanded condition.

2. In an animal snare, a length of flexible wire adapted to be attached at one end to a fixed object, the opposite end of said wire comprising a contractible loop, a weight secured to the free end of said wire and having an opening therethrough through which the anchored end of said wire is trained, a keeper member carried by said weight, a trigger member pivotally connected at one end with the wire adjacent the anchored end of the latter, said trigger member having a head engageable with the keeper for releasably retaining the loop in expanded condition, and a hook member secured to said wire at the end thereof equipped with said weight.

JOHN GUIN BURNS.